(12) United States Patent
Greenberg et al.

(10) Patent No.: US 8,872,812 B2
(45) Date of Patent: Oct. 28, 2014

(54) POWER SAVING IN MOBILE DEVICES BY OPTIMIZING FRAME RATE OUTPUT

(75) Inventors: Shimeon Greenberg, Yavne (IL); Ofer Bar-Shalom, Kiryat Ono (IL)

(73) Assignee: Marvell World Trade Ltd., St. Michael (BB)

( * ) Notice: Subject to any disclaimer, the term of this patent is extended or adjusted under 35 U.S.C. 154(b) by 804 days.

(21) Appl. No.: 12/945,453

(22) Filed: Nov. 12, 2010

(65) Prior Publication Data
US 2011/0109624 A1 May 12, 2011

Related U.S. Application Data (60) Provisional application No. 61/260,735, filed on Nov. 12, 2009.

(51) Int. Cl.
*G06T 15/00* (2011.01)
*G06F 15/00* (2006.01)
*G06T 1/00* (2006.01)
*G06F 1/32* (2006.01)

(52) U.S. Cl.
CPC .......... *G06F 1/3203* (2013.01); *Y02B 60/1242* (2013.01); *Y02B 60/1217* (2013.01); *G06T 1/00* (2013.01); *G06F 1/3265* (2013.01); *G06F 1/324* (2013.01)
USPC .......................................... 345/419; 345/501

(58) Field of Classification Search
CPC ..... G06F 1/3203; G06F 1/324; G06F 1/3265; G06T 1/00; Y02B 60/1217
See application file for complete search history.

(56) References Cited

U.S. PATENT DOCUMENTS

| | | | |
|---|---|---|---|
| 7,483,034 B2 * | 1/2009 | Chefd'hotel et al. | 345/582 |
| 2005/0057571 A1 * | 3/2005 | Stevens | 345/501 |
| 2007/0200838 A1 | 8/2007 | Lee et al. | |
| 2007/0206018 A1 * | 9/2007 | Bajic et al. | 345/501 |
| 2008/0001934 A1 * | 1/2008 | Wyatt | 345/204 |
| 2008/0192060 A1 * | 8/2008 | Ogiso | 345/546 |
| 2009/0185072 A1 * | 7/2009 | Matsuno | 348/390.1 |

FOREIGN PATENT DOCUMENTS

CN 101031042 A 9/2007

* cited by examiner

*Primary Examiner* — Kee M Tung
*Assistant Examiner* — Sing-Wai Wu (57) ABSTRACT

Embodiments of the present disclosure provide a method comprising providing 2-D or 3-D graphics content to a graphics processing module; processing the graphics content to generate a stream of images (e.g., three dimensional images and/or two dimensional images) for display, the stream having a frame rate; and governing a rate of processing the graphics content to limit the frame rate of the generated stream of images to be less than or equal to a frame rate threshold. Other embodiments may also be described and claimed.

20 Claims, 5 Drawing Sheets

POWER SAVING IN MOBILE DEVICES BY OPTIMIZING FRAME RATE OUTPUT

CROSS REFERENCE TO RELATED APPLICATIONS

This disclosure claims priority to U.S. Provisional Patent Application No. 61/260,735, filed Nov. 12, 2009, the entire specification of which is hereby incorporated by reference in its entirety for all purposes, except for those sections, if any, that are inconsistent with this specification.

TECHNICAL FIELD

Embodiments of the present disclosure relate to the generation of two dimensional (2-D) and/or three dimensional (3-D) graphics in battery power devices, and more particularly, to reducing power consumption in mobile devices by optimizing a frame rate output of graphics images.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Increasingly, battery powered and mobile devices are providing graphics in general and more specifically are offering video gaming capabilities employing graphics images. Although image frames are two dimensional, graphics can be rendered, that is processed for display, to depict either two-dimensional or three dimensional scenery. In general, graphics processors, often referred to as graphics accelerators, run at an undefined frame rate. In contrast to conventional video imagery, graphics accelerators are typically configured to generate graphics at a variable frame rate of streaming images, and to run at the fastest frame rate possible, limited only by processing capability. In some cases, graphics accelerators achieve a high a frame rate, e.g., as high as 90 to even 100 frames per second. On the one hand, the generation of graphics at such high frame rates consumes considerable amounts of power. However, for various reasons including for example physical limitations of the human eye and refresh rates of displays, exceptionally high frame rates do not necessarily contribute to an improved user experience when viewing graphics images.

SUMMARY

In one embodiment, the present disclosure provides a method comprising providing two dimensional (2-D) and/or three-dimensional (3-D) graphic content to a graphics processing module; processing the graphics content to generate a stream of images for display, the stream having a frame rate; and governing a rate of processing the graphic content to limit the frame rate of the generated stream of images to be less than or equal to a frame rate threshold. In embodiments, processing the graphics content includes one or more of pre-processing or decoding the content, generating rendering commands and rendering graphics images for display responsively to the rendering commands. In some embodiment the graphics images are two dimensional and scenes in depicted in the images are two dimensional, while in other embodiments the graphics images are two dimensional but the scenes depicted are three dimensional.

There is also provided an apparatus comprising a video processing module, such as a video decoder, for processing image content to generate a stream of images for display; a graphics processing unit (GPU) for processing the stream of images (e.g., depicting 3-D scenes and/or 2-D scenes); and a control module for governing a processing rate of the graphics processing module or the GPU, based at least in part on a frame rate of the stream of images. In embodiments the control module is configured to govern the rate of processing at the graphics processing module and/or the GPU so that the rate at which image frames are rendered for display is less than a threshold frame rate.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments herein are illustrated by way of example and not by way of limitation in the figures of the accompanying drawings.

DETAILED DESCRIPTION

Embodiments of the present disclosure describe techniques, structures, and configurations for reducing power consumption in computing devices, especially mobile devices, by optimizing frame rate output in graphics acceleration applications. In the following detailed description, reference is made to the accompanying drawings which form a part hereof, wherein like numerals designate like parts throughout. Other embodiments may be utilized and structural or logical changes may be made without departing from the scope of the present disclosure. Therefore, the following detailed description is not to be taken in a limiting sense, and the scope of embodiments is defined by the appended claims and their equivalents.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1A:
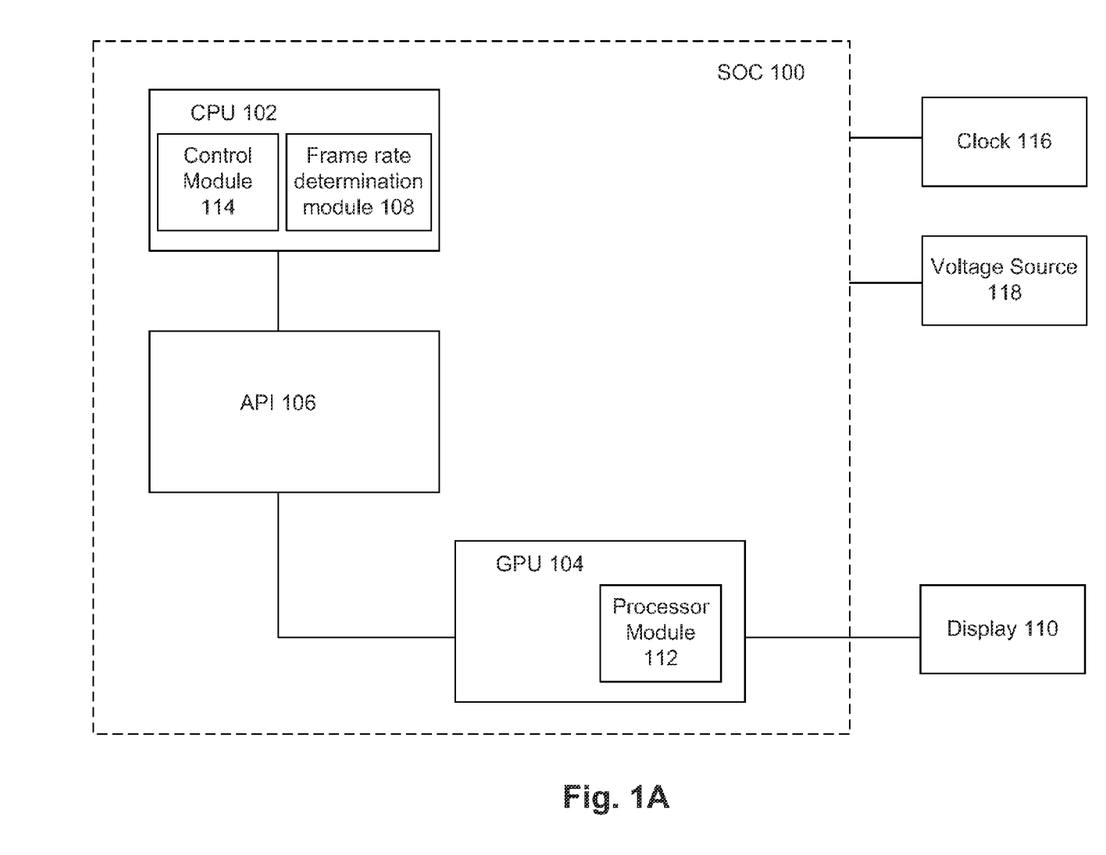
FIGS. 1A-1C schematically illustrate embodiments of an arrangement for reducing power consumption when displaying images on a display, in accordance with an embodiment of the disclosure.

FIG. 1A schematically illustrates embodiments of an arrangement 100 for reducing power consumption when displaying graphics images on a display 110, in accordance with an embodiment of the disclosure. In an embodiment, the arrangement 100 is configured to reduce power consumption when displaying graphics images on the display 110. Display 110 is configured to display 2-D image frames. In some embodiments, scenes depicted in the graphic images are two-dimensional, while in other embodiments the scenes depicted are three-dimensional. Display 110 may also be configured to display stereoscopic, 3-D images, for example by combining pairs of two dimensional images.

In an embodiment, the arrangement 100 comprises a system-on-chip (SOC). In an embodiment, the arrangement 100 comprises a processing module (e.g., a video processing module or a video decoder) in the form of a central processing unit (CPU) 102 and a graphics accelerator in the form of a graphics processing unit (GPU) 104 that includes a processor module 112.

In an embodiment, the CPU 102 and the GPU 104 are coupled by an interface 106, which is generally in the form of an application programming interface (API). The API 106 transfers instructions and data from the CPU 102 to the GPU 104. In accordance with an embodiment, the CPU 102 includes a frame rate determination module 108 that determines a frame rate of rendered graphics image frames that are to be displayed by the display 110. In an embodiment, the frame rate determination module 108 is a sensing module that senses the frame rate of rendered graphics image frames, e.g. 2-D images depicting 2-D or 3-D scenes, which are to be displayed by the display 110. In an embodiment, the CPU 102 also includes a control module 114.

Although the CPU 102, the API 106 and the GPU 104 are illustrated to be included in the SOC 100, in another embodiment, one or more of these components (or a part of one or more of these components) can be external to the SOC 100.

In accordance with an embodiment, the CPU 102 runs an application that requires graphics images to be displayed on display 110. The application may be, for example, a game, a computer graphics, animation, "live" navigation maps, or the like. The application provides graphic content for graphic image frames to be displayed on the display 110. Video content, as used herein, may refer to any type of graphic content (e.g., graphic image content), e.g., content associated with video games, computer graphics, animations, "live" navigation maps, streams of video images and/or the like.

In an embodiment, the graphic content includes variable frame rate streams of graphic content. The CPU 102 processes formulas and/or equations associated with the graphic content to generate image frames. For example, the CPU 102 includes video decoder functionality and processes formulas and/or equations to generate image frames corresponding to scenes depicted in an application, such as a video game, navigation and the like. The formulas and/or equations are associated with, for example, a manner in which the image frames are to be displayed (e.g., associated with content of the image frames), changes between subsequent images (e.g. due to movement of objects within the image frames), perspective and shading to provide 3-D effects when graphically depicting 3-D scenes, and/or the like. In an embodiment, commands corresponding to image frames of the CPU (which may be internal to the CPU) for rendering 2-D or 3-D scenes are subsequently provided to the GPU 104, which then decodes the commands and renders depicted scenes into two dimensional video frames for display on display 110. In some embodiments the scenes are two dimensional scenes that are rendered into two dimensional images for display. In other embodiments, the scenes are three dimensional scenes that are rendered into two dimensional images for display. Also, in some embodiments 3-D scenes are provided for stereoscopic display on display 110.

In some embodiments, the processing rate is governed at CPU 102 to throttle the rate of generation of graphic image frames which need to be rendered, and/or the rate of generation of one or more rendering commands. In other embodiments the processing rate is governed at GPU 104 to directly throttle the rate at which the displayed image frames are rendered. In an example, a screen refresh rate varies between about 30 to 60 frames/second for the display 110, although the teachings of the current disclosure are not limited by this aspect. The rate at which graphics images are generated for display is throttled so that rendered images are not supplied to the display faster than the refresh rate of the display. As previously noted, in embodiments, the rate of display image generation is governed at one or more of the CPU 102 (e.g. generation of rendering commands) or GPU 104 (e.g. actual rendering of scenes into image frames for display).

In an embodiment, the formulas and/or equations, along with video data, are forwarded from the CPU 102 to the GPU 104 via the API 106. In an embodiment, the frame rate determination module 108 determines frame rates at which image frames can be generated from graphics content, for example by sensing a rate of generated image frames for display, or by estimating a speed at which frames of image content can be decoded and/or rendered into images for display.

In an embodiment, if a determined frame rate of a stream of rendered image frames exceeds a predetermined frame rate threshold, a rate of processing the images, e.g. by decoding at CPU 102 and/or by rendering at GPU 104, is governed (e.g., by the control module 114) to limit the frame rate of the stream of graphics images to be less than or equal to the frame rate threshold. For example, if the frame rate of the stream of rendered images of graphics for display (e.g., as determined by the frame rate determination module 108) is higher than the frame rate threshold, then the control module 114 instructs the CPU and/or the GPU 104 to "slow-down" the generation of video frames and/or rendered graphics images. In another example, the control module 114 instructs the CPU 114 to provide graphic rendering commands at a different frame rate to the GPU 104, for rendering of the particular stream of image frames for display on the display 110. In another example, the CPU 102 and/or the GPU 104 temporarily stalls processing of the graphics content so that the CPU 102 and/or the GPU 104 do not advance to a next image frame, and/or use other suitable method to reduce the frame rate. In another example, the control module 114 governs the processing of graphic image content at the CPU 102 such that the CPU 102 limits processing formulas and/or equations associated with the graphic image frames (e.g., so that the frame rate of the stream of the rendered graphic image frames is less than the frame rate threshold). Since there is little or no difference in user experience when viewing a motion picture in which the image frames are streamed at, for example, about 30 frames/second, or greater than 30 frames/second, the predetermined frame rate threshold is generally in a range of about 24 frames per second to about 35 frames per second. In an example, the frame rate threshold is 30 frames per second. Moreover, as mentioned above, a limiting factor affecting user experience when viewing images may be a refresh rate of the display; when images are generated faster than the refresh rate, not all changed image content can be displayed. Ultimately, this would mean that the power used in rendering images that have changed content, but which can not be displayed, would be essentially wasted.

In an embodiment, the GPU 104 takes the formulas and/or equations (e.g., as determined by the CPU 102) and the video frames of graphics from the CPU 102, along with the limited frame rate or rates, and processes the video data with processor module 112 in accordance with the formulas and/or equations in order to render scenes depicted in the video frames into images for display as required by the application. The stream of image frames for display, which although are two dimensional may depict 2-D or 3-D scenes, is then provided by the GPU 104 to the display 110 so that the images can be displayed on the display 110 at the appropriate frame rate. In an embodiment, the CPU 102 receives data, including image frames, from the GPU 104 for further processing, for example for updating of images instead of calculation of the entire image from scratch. In other embodiments, the CPU 102 is configured to transmit graphic image frames directly to the display 110 (e.g., bypassing the GPU 104).

Figure 1B:
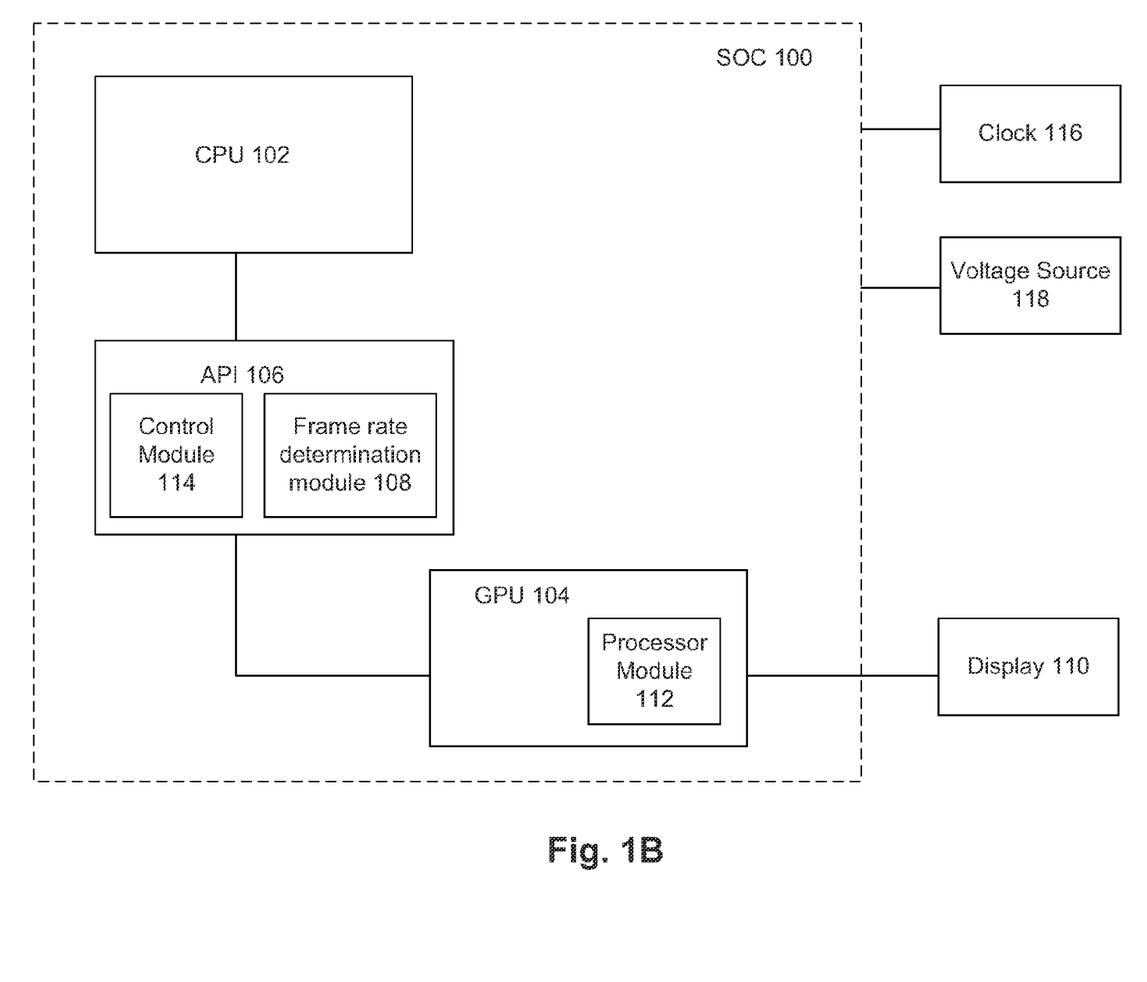

Referring to FIG. 1B, in accordance with an embodiment, the API 106 includes the frame rate determination module 108 and the control module 114. In accordance with such an embodiment, the CPU 102 pre-processes the image content, e.g. performs video decoding, for the application as previously described and forwards the calculated formulas and/or equations, e.g. in the form of rendering commands, along with video data for the graphics, to the API 106 for forwarding on to the GPU 104. The frame rate determination module 108 (e.g., which can be a frame rate sensing module configured to sense frame rates of 3-D image streams) within the API 106 determines frame rates within either the pre-processed video content or the video data from the CPU 102. Additionally or alternatively, the frame rate determination module 108 receives feedback indicative of an actual rate of rendering of image frames from the GPU 104. The control module 114 within the API 106 then instructs the GPU 104 and/or the CPU 102 to govern the processing rate of the CPU 102 and/or the GPU 104 such that the frame rate of output images for display, as rendered by the GPU 104 and/or as displayed in the display 110, is less than (or about) the frame rate threshold. For example, control module 114 instructs the CPU 102 to slow-down the generation of video frame rates or rendering commands, and/or instructs the GPU 104 to slow-down the generation of image frames of graphics for display, when the rate of generating rendered image frames exceeds the frame rate threshold. In an embodiment, the frame rate is slowed down to be within a predetermined range, i.e., between about 24-35 frames per second (e.g., at about 30 frames per second). Thus, in such an embodiment, the API 106 serves as a throttle for the GPU 104 and/or the CPU 102.

In an embodiment, the arrangement 100 operates in two modes, e.g., (i) a first mode in which the processing rate of the video content is governed such that the frame rate of the 3-D images, as rendered by the GPU 104 and/or as displayed in the display 110, is less than the frame rate threshold, and (ii) a second mode in which no such governing is performed. In an example, the first mode is associated with power consumption optimization, while the second mode is associated with performance optimization.

Figure 1C:
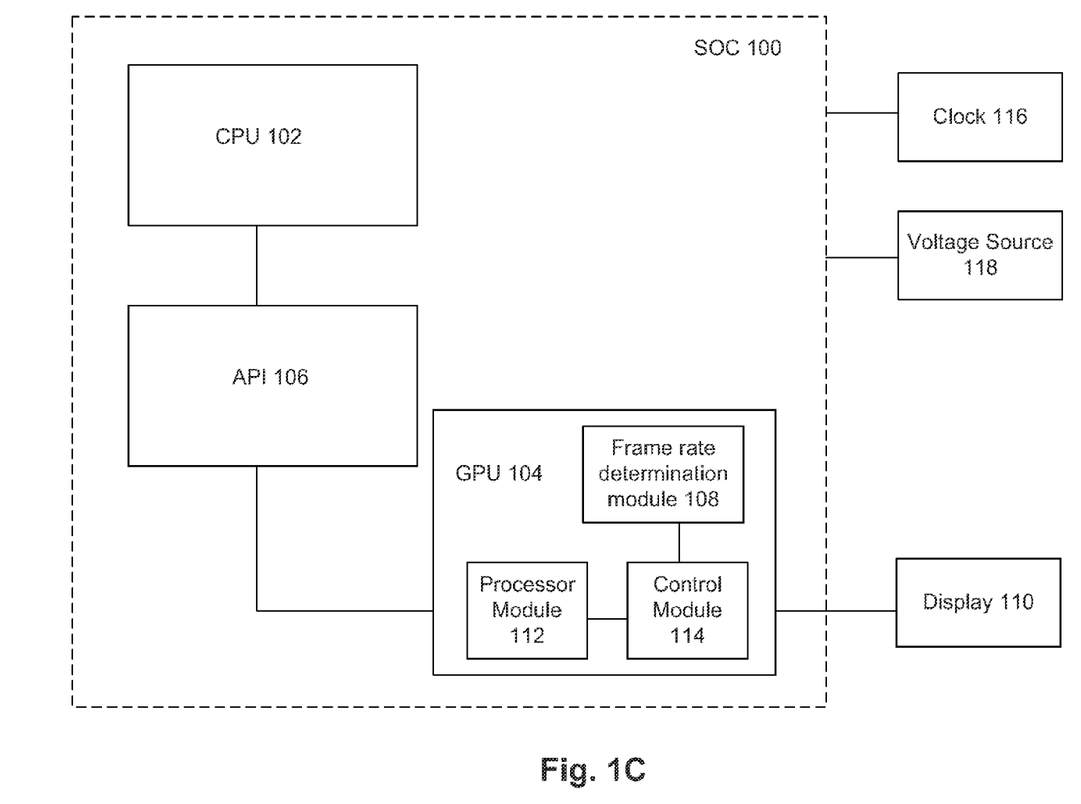

Referring to FIG. 1C, another embodiment for arrangement 100 is schematically illustrated. In this embodiment, the GPU 104 includes the frame rate determination module 108 that is configured to determine (e.g., estimate, sense or measure) a frame rate for a stream of 2-D images of the graphics to be displayed. As noted above, displayed 2-D images may depict 2-D or 3-D scenes, depending on the application. Alternatively, in an embodiment, sequences of 2-D images pairs are combined at the display device to provide stereoscopic images. In an embodiment, the control module 114 and the processor module 112 are also included within the GPU 104. The GPU 104 renders the stream of graphics images to be displayed on the display 110, based upon receiving pre-processed or decoded video content and/or video data (e.g., stream of video frames depicting scenes to be displayed) and/or image rendering commands from the CPU 102. The processor module 112 processes the pre-processed video content and video data received from the CPU 102. The control module 114 controls the processor module 112 to operate within frame rates based upon the determined frame rates from the frame rate determination module 108 in comparison to the pre-determined frame rate threshold. The control module 114 governs a processing rate of the processor module 112 such that the frame rates of the stream of generated, e.g. rendered, graphics image frames are within a predetermined range, i.e., between 24-35 frames per second (e.g., about 30 frames per second). In accordance with an embodiment, the GPU 104 includes a processing module (not shown) such as a video decoder that preprocesses video content instead of the CPU 102.

By governing (e.g., slowing down) a speed of pre-processing (e.g., speed of processing function/equation associated with graphics image frames) and/or by governing a speed of rendering of graphics image frames (e.g., such that the rendered image frames are output at less than or about the pre-determined frame rate threshold), relatively less power is required for the GPU 104 and, in some instances, the CPU 102 (e.g., compared to a power requirement when the stream of graphics images are rendered at its original frame rates).

With reference to FIGS. 1A-1C, it is noted that in an embodiment, the CPU 102 or control module 114 are configured to instruct a clock 116 (which, for example, supplies a clock signal to one or more components of the arrangement 100) to control (e.g., slow-down) a clock frequency for operation of the arrangement 100. By slowing down the clock frequency of the arrangement 100, a corresponding drop in voltage for operation of the arrangement 100 generally occurs within the arrangement 100, thereby reducing power consumption by the arrangement 100. The CPU 102 or control module 114 can also instruct a voltage source 118 (e.g., which supplies voltage to one or more components of the arrangement 100) to decrease a voltage provided to the arrangement 100, based upon the reduced frame rate. Thus, in an example where the application being processed by the arrangement 100 is a 3-D video game, the arrangement 100 can start the 3-D video game, and generate the accompanying stream of graphic image frames depicting 3-D scenes, at full clock speed. Subsequently, the arrangement 100 estimates a clock speed needed to generate frames for display at about the frame rate threshold. The CPU 102 or control module 114 then lowers the clock rate, which generally lowers the voltage in a corresponding manner and results in a decreased power consumption of the arrangement 100.

In an embodiment, the teachings of the current disclosure apply to processing of graphics images that depict one or more of 2-D scenes and 3-D scenes. It is noted that the graphics images generated are two dimensional in nature, inasmuch as they are displayed on a two dimensional display, however scenery and other content may be projected in the image as depicting either 2-D scenes or 3-D scenes by using suitable perspective, shading and the like. In graphics images, provision of graphics effects that depict three dimensions typically requires intensive power consuming processing which can be reduced as described hereinabove. By the same token, updating images that merely depict 2-D imagery, as is used in some games and applications such as mapping/navigational programs for example, at a frame rate that does not contribute to user experience also unnecessarily consumes power.

Figure 2:
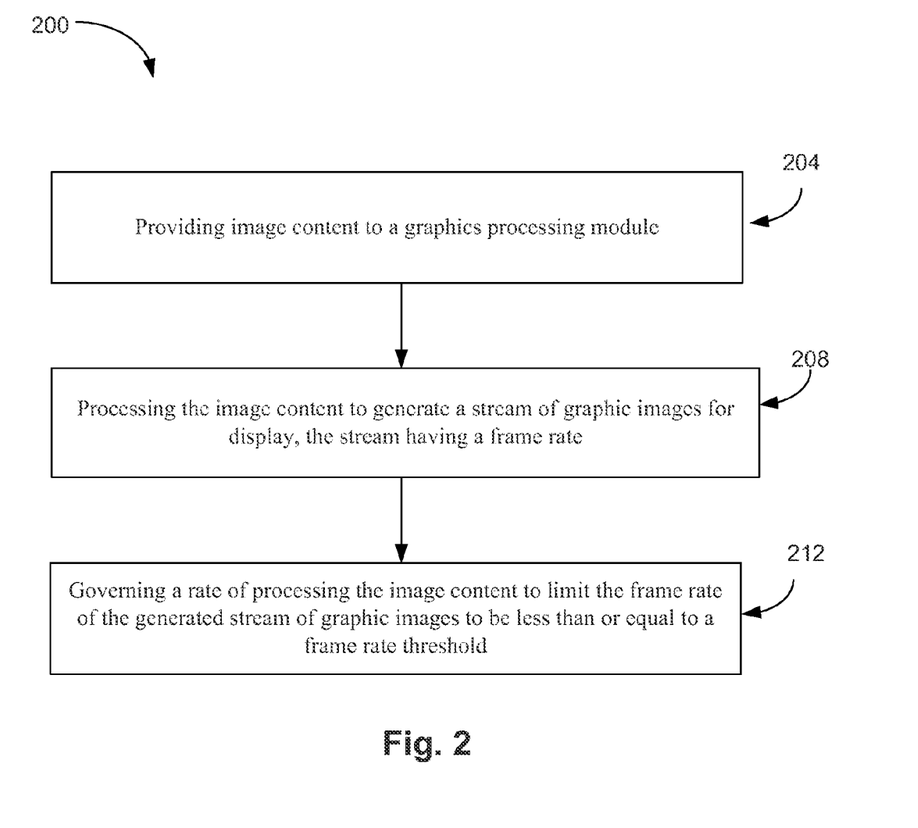
FIG. 2 is a process flow diagram of a method to reduce power consumption in devices that display images, in accordance with an embodiment of the disclosure.

FIG. 2 is a flow chart illustrating a method 200 to reduce power consumption in devices that display images, in accordance with an embodiment of the disclosure. At 204, image content is provided to a graphics processing module (e.g., CPU 102). At 208, the image content is processed (e.g., by the CPU 102 and/or by the GPU 104) to generate a stream of graphic images (e.g., to render a stream of graphic images that depict one of 2-D and 3-D scenes based on the commands) for display (e.g., in the display 110), the stream having a frame rate. At 212, the control module 114 governs a rate of processing the image content at operations 204 and/or 208 to limit the frame rate of the generated stream of graphic images to be less than or equal to a frame rate threshold.

Figure 3:
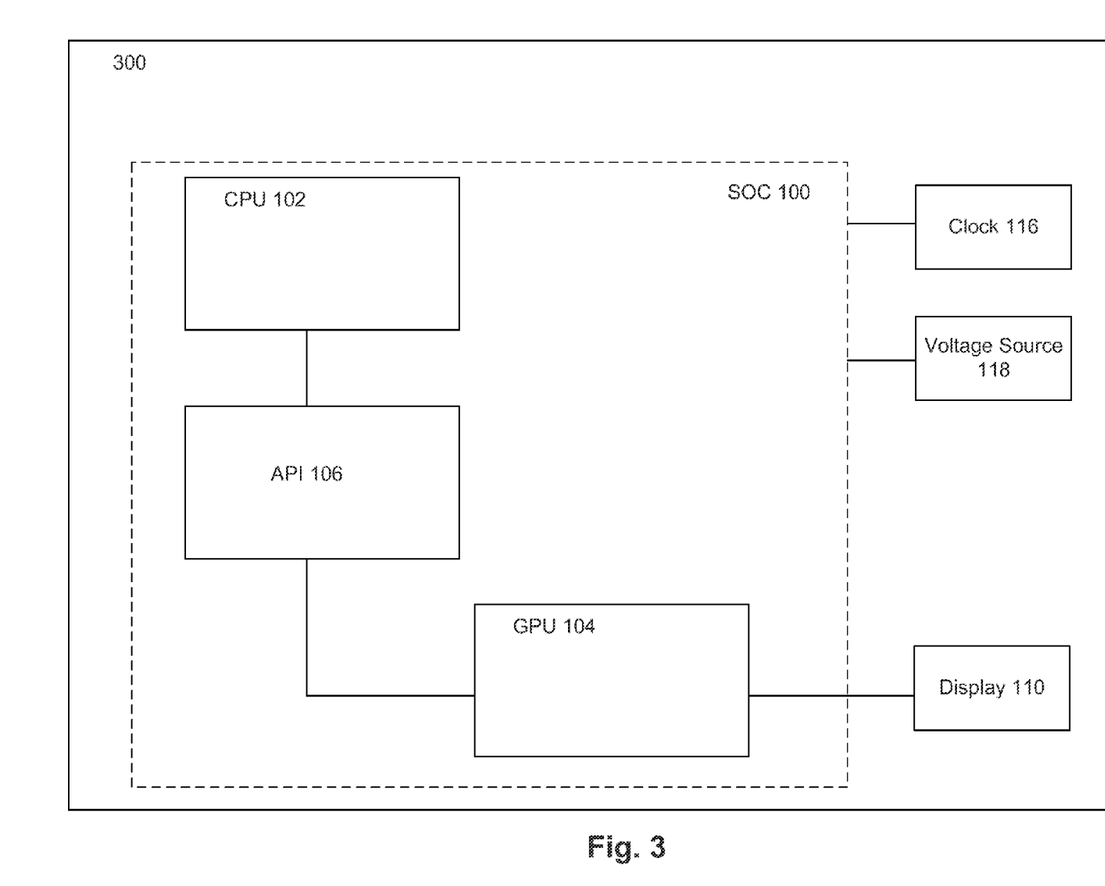
FIG. 3 schematically illustrates embodiments of a computing device incorporating the arrangement of FIGS. 1A, 1B and/or 1C, in accordance with an embodiment of the disclosure.

FIG. 3 schematically illustrates embodiments of a computing device 300 incorporating the arrangement of FIGS. 1A, 1B and/or 1C, in accordance with an embodiment of the disclosure. The computing device 300 is, for example, a battery powered device, e.g., a hand held device, a mobile device, and/or the like. For example, the computing device 300 is a mobile phone, a gaming device, a personal digital assistance (PDA), a laptop, and/or the like. In an embodiment, the computing device 300 provides 3-D graphics, 2-D graphics and/or offers video gaming capabilities.

As illustrated, the computing device 300 includes the arrangement 100 (e.g., any of the arrangements illustrated in FIGS. 1A-1C). In an embodiment, the computing device 300 is configured to reduce power consumption when displaying images (e.g., images of 2-D and/or 3-D scenery) on the display 110. For example, the computing device 300 processes video content to generate a stream of images for displaying moving images, the stream having a frame rate; and governs a rate of processing the video content to limit the frame rate of the generated stream of images to be less than or equal to a frame rate threshold.

Although certain embodiments have been illustrated and described herein, a wide variety of alternate and/or equivalent embodiments or implementations calculated to achieve the same purposes may be substituted for the embodiments illustrated and described without departing from the scope of the present disclosure. This disclosure is intended to cover any adaptations or variations of the embodiments discussed herein. Therefore, it is manifestly intended that embodiments described herein be limited only by the claims and the equivalents thereof.

What is claimed is:

1. A method comprising:
   receiving a stream of images;
   preprocessing, by a central processing unit (CPU), the stream of images to generate a preprocessed stream of images;
   transmitting the preprocessed stream of images to a graphic processing unit (GPU);
   rendering, by the GPU, the preprocessed stream of images, to generate a rendered stream of images for displaying on a display;
   ascertaining a first frame rate that is associated with one of (i) the preprocessed stream of images or (ii) the rendered stream of images;
   determining a refresh rate of the display;
   comparing the first frame rate to the refresh rate of the display; and
   based on comparing the first frame rate to the refresh rate, controlling (i) a rate of preprocessing, by the CPU, the stream of images, and (ii) a rate of rendering, by the GPU, the preprocessed stream of images, the controlling being performed such that a frame rate of the rendered stream of images is substantially equal to the refresh rate of the display.

2. The method of claim 1, wherein preprocessing the stream of images further comprises:
   video decoding the stream of images to generate the preprocessed stream of images.

3. The method of claim 1, wherein controlling each of (i) the rate of preprocessing, by the CPU, the stream of images, and (ii) the rate of rendering, by the GPU, the preprocessed stream of images further comprises:
   reducing each of (i) the rate of preprocessing, by the CPU, the stream of images, and (ii) the rate of rendering, by the GPU, the preprocessed stream of images such that the frame rate of the rendered stream of images is substantially equal to the refresh rate of the display.

4. The method of claim 1, wherein ascertaining the first frame rate further comprises:
   ascertaining the first frame rate such that the first frame rate is a frame rate of the preprocessed stream of images.

5. The method of claim 1, wherein ascertaining the first frame rate further comprises:
   ascertaining the first frame rate such that the first frame rate is a frame rate of the rendered stream of images.

6. The method of claim 1, further comprising:
   in response to the first frame rate being higher than the refresh rate of the display, reducing a clock frequency of a clock signal used for preprocessing the stream of images.

7. The method of claim 1, further comprising:
   in response to the first frame rate being higher than the refresh rate of the display, reducing a voltage level of voltage signal supplied to one or both of the CPU and the GPU.

8. The method of claim 1, wherein ascertaining the first frame rate further comprises:
   sensing, within an application programming interface (API), the first frame rate, the API being coupled to each of the CPU and the GPU.

9. The method of claim 1, further comprising:
   displaying the rendered stream of images on the display.

10. The method of claim 1, wherein receiving the stream of images comprises:
    receiving the stream of images such that the stream of images correspond to two-dimensional (2-D) or three-dimensional (3-D) scenes.

11. An apparatus comprising:
    a central processing unit (CPU) configured to (i) receive a stream of images, and (ii) preprocess the stream of images to generate a preprocessed stream of images;
    a graphic processing unit (GPU) configured to (i) receive the preprocessed stream of images from the CPU, and (ii) render the preprocessed stream of images, to generate a rendered stream of images for displaying on a display;
    a frame rate determination module configured to (i) ascertain a first frame rate that is associated with one of the preprocessed stream of images or the rendered stream of images, (ii) determine a refresh rate of the display, and (iii) compare the first frame rate to the refresh rate of the display; and
    a control module configured to, based on the first frame rate being compared to the refresh rate, control (i) a rate of preprocessing, by the CPU, the stream of images, and (ii) a rate of rendering, by the GPU, the preprocessed stream of images, the controlling being performed such that a frame rate of the rendered stream of images is substantially equal to the refresh rate of the display.

12. The apparatus of claim 11, wherein the CPU is configured to preprocess the stream of images by:
    video decoding the stream of images to generate the preprocessed stream of images.

13. The apparatus of claim 11, wherein the control module is configured to control each of (i) the rate of preprocessing, by the CPU, the stream of images, and (ii) the rate of rendering, by the GPU, the preprocessed stream of images by:

reducing each of (i) the rate of preprocessing, by the CPU, the stream of images, and (ii) the rate of rendering, by the GPU, the preprocessed stream of images such that the frame rate of the rendered stream of images is substantially equal to the refresh rate of the display.

14. The apparatus of claim 11, wherein the frame rate determination module is configured to ascertain the first frame rate such that the first frame rate is a frame rate of the preprocessed stream of images.

15. The apparatus of claim 11, wherein the frame rate determination module is configured to ascertain the first frame rate such that the first frame rate is a frame rate of the rendered stream of images.

16. The apparatus of claim 11, further comprising:
a clock module configured to, in response to the first frame rate being higher than the refresh rate of the display, reduce a clock frequency of a clock signal used for preprocessing the stream of images.

17. The apparatus of claim 11, further comprising:
a voltage source configured to, in response to the first frame rate being higher than the refresh rate of the display, reduce a voltage level of voltage signal supplied to one or both of the CPU and the GPU.

18. The apparatus of claim 11, further comprising:
an application programming interface (API) comprising the frame rate determination module, the API being coupled to each of the CPU and the GPU.

19. The apparatus of claim 11, further comprising:
the display for displaying the rendered stream of images.

20. The apparatus of claim 11, wherein the stream of images correspond to two-dimensional (2-D) or three-dimensional (3-D) scenes.

* * * * *